US010526033B2

(12) United States Patent
Horiguchi et al.

(10) Patent No.: US 10,526,033 B2
(45) Date of Patent: Jan. 7, 2020

(54) VEHICLE

(71) Applicant: EQUOS RESEARCH CO., LTD., Tokyo (JP)

(72) Inventors: Munehisa Horiguchi, Tokyo (JP); Akira Mizuno, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 16 days.

(21) Appl. No.: 15/576,557

(22) PCT Filed: May 24, 2016

(86) PCT No.: PCT/JP2016/065342
§ 371 (c)(1),
(2) Date: Nov. 22, 2017

(87) PCT Pub. No.: WO2016/190318
PCT Pub. Date: Dec. 1, 2016

(65) Prior Publication Data
US 2018/0148118 A1    May 31, 2018

(30) Foreign Application Priority Data
May 27, 2015    (JP) .................................. 2015-108019

(51) Int. Cl.
*B62K 5/10*    (2013.01)
*B62K 5/027*    (2013.01)
(Continued)

(52) U.S. Cl.
CPC .................. *B62K 5/10* (2013.01); *B62K 5/02* (2013.01); *B62K 5/027* (2013.01);
(Continued)

(58) Field of Classification Search
CPC ... B62K 5/10; B62K 5/05; B62K 5/02; B62K 5/027; B62K 5/025; B62K 5/00;
(Continued)

(56) References Cited

U.S. PATENT DOCUMENTS 4,921,263 A * 5/1990 Patin .................... B60G 21/007
                                                  280/62
4,974,863 A * 12/1990 Patin ....................... B62D 9/02
                                                  280/124.103
(Continued)

FOREIGN PATENT DOCUMENTS

BE        1010650 A3 * 11/1998 ............... B60G 3/18
CN       102448791 A      5/2012
(Continued)

OTHER PUBLICATIONS

Aug. 23, 2016 International Search Report issued in International Patent Application No. PCT/JP2016/065342.
(Continued)

*Primary Examiner* — Keith J Frisby
(74) *Attorney, Agent, or Firm* — Oliff PLC

(57) ABSTRACT

The vehicle includes: a vehicle body rotatable about a roll axis; one or more front wheels; a front wheel support supporting the one or more front wheels turnably to a turning direction about a turning axis; one or more rear wheels; an operation input unit to be operated to input a turning direction; a lean angle changing unit for changing a lean angle of the vehicle body in a vehicle width direction about a lean axis different from the roll axis; and a lean control unit for controlling the lean angle changing unit.

6 Claims, 8 Drawing Sheets

(51) Int. Cl.
*B62D 61/08* (2006.01)
*B62K 5/02* (2013.01)
*B62K 5/00* (2013.01)
*B62K 5/05* (2013.01)

(52) U.S. Cl.
CPC ........ *B60G 2300/122* (2013.01); *B62D 61/08* (2013.01); *B62K 5/05* (2013.01); *B62K 2005/001* (2013.01); *B62K 2207/02* (2013.01)

(58) Field of Classification Search
CPC .......... B62K 2207/02; B62K 2005/001; B62D 9/02; B62D 9/04; B62D 61/06; B62D 61/065; B62D 61/08; B60G 2300/45; B60G 2300/122; B60G 21/007
USPC ......... 280/6.15, 124.103, 5.509, 62; 180/210
See application file for complete search history.

(56) References Cited

U.S. PATENT DOCUMENTS

| | | | |
|---|---|---|---|
| 6,328,125 | B1 | 12/2001 | Van Den Brink et al. |
| 7,568,541 | B2 | 8/2009 | Pfeil et al. |
| 9,010,476 | B2 | 4/2015 | Matsuda |
| 9,248,857 | B2* | 2/2016 | Spahl ...................... B62D 9/02 |
| 2008/0197597 | A1* | 8/2008 | Moulene .............. B60G 21/007 |
| | | | 280/124.103 |
| 2009/0312908 | A1 | 12/2009 | Van Den Brink |
| 2012/0118194 | A1 | 5/2012 | Schneider et al. |
| 2014/0312580 | A1 | 10/2014 | Gale |
| 2016/0280307 | A1* | 9/2016 | Takenaka ............... B62K 21/00 |

FOREIGN PATENT DOCUMENTS

| | | |
|---|---|---|
| JP | 2013-144471 A | 7/2013 |
| JP | 2013-233895 A | 11/2013 |
| JP | 2014-524864 A | 9/2014 |
| WO | 2011/102106 A1 | 8/2011 |
| WO | 2012/059959 A1 | 5/2012 |
| WO | 2013/005007 A1 | 1/2013 |

OTHER PUBLICATIONS

Aug. 23, 2016 Written Opinion issued in International Patent Application No. PCT/JP2016/065342.
Jan. 7, 2019 Extended European Search Report issued in European Patent Application No. 16800023.0.
Apr. 30, 2019 Office Action issued in Chinese Patent Application No. 201680028133.7.

* cited by examiner

VEHICLE

TECHNICAL FIELD

This disclosure relates to a vehicle which turns by leaning its vehicle body.

BACKGROUND ART

Vehicles which lean during turning have been proposed. For example, a technique for turning a vehicle to the left with its vehicle body leaning to the left by making drive force of a motor for a right rear wheel larger than that of a motor for a left rear wheel was proposed.

PRIOR ART DOCUMENT

Patent Document

Patent Document 1 Japanese Laid-Open Patent Publication No. 2013-233895

SUMMARY OF THE INVENTION

Problems to be Solved by the Invention

However, driving stability of such a vehicle may decrease. For example, the vehicle body may shake when the vehicle makes a change in traveling direction.

This disclosure discloses the technique of improving driving stability of vehicle.

Means for Solving the Problems

For example, this disclosure discloses the following application examples.

Application Example 1

A vehicle comprising:
a vehicle body rotatable about a roll axis;
one or more front wheels;
a front wheel support supporting the one or more front wheels turnably to a turning direction about a turning axis;
one or more rear wheels;
an operation input unit to be operated to input a turning direction;
a lean angle changing unit for changing a lean angle of the vehicle body in a vehicle width direction about a lean axis different from the roll axis; and
a lean control unit for controlling the lean angle changing unit, wherein
at least one of the one or more front wheels and the one or more rear wheels includes a pair of wheels arranged in the vehicle width direction,
the vehicle body is configured so that a gravity center of the vehicle body is located below the roll axis,
when a turning direction is input to the operation input unit, the lean control unit causes the lean angle changing unit to change the lean angle so that the vehicle body leans toward the turning direction, and
the one or more front wheels turn, after beginning of change in the lean angle, to such a direction that the vehicle turns to the turning direction.

According to this configuration, because the gravity center of the vehicle body is lower than the roll axis, the orientation of the vehicle body about the roll axis can be stabilized even if the vehicle makes a change in traveling direction. Because when a turning direction is input to the operation input unit, the lean angle of the vehicle body is changed so that the vehicle body leans toward the turning direction, the turning of the vehicle can be also stabilized. Because the one or more front wheels turn, after the beginning of change in the lean angle, to such a direction that the vehicle turns to the turning direction side, shaking of the vehicle can be suppressed as compared with the case where the front wheels turn prior to changing the lean angle. The above can enable driving stability of the vehicle to be improved.

Application Example 2

The vehicle according to Application Example 1, wherein
the front wheel support is configured so that an intersection point between the turning axis and a ground is located in front of a contact point of the one or more front wheels with the ground, and
the front wheel support has an operation mode for turnably supporting the one or more front wheels regardless of a turning direction input into the operation input unit.

According to this configuration, the one or more front wheels can spontaneously turn to such a direction that the vehicle turns to the turning direction after the beginning of change in the lean angle, and so the traveling direction of the vehicle can be smoothly changed. This can result in improved driving stability of the vehicle.

Application Example 3

The vehicle according to Application Example 1 or 2, wherein
the lean angle changing unit changes respective lean angles of the pair of wheels and the vehicle body with respect to the ground.

According to this configuration, stability during high speed turn can be improved as compared with the case where the vehicle body leans without the pair of wheels leaning.

Application Example 4

The vehicle according to any one of Application Examples 1 to 3, wherein
when viewing in a front direction of the vehicle, a distance between centers of respective contact surfaces of the pair of wheels is smaller than a height of the gravity center of the vehicle body from the ground.

It is possible to realize a vehicle with a smaller spacing between a pair of wheels as in this configuration because the driving stability of the vehicle is improved as described above.

Application Example 5

The vehicle according to any one of Application Examples 1 to 4, wherein
the one or more front wheels are configured as a single wheel, and
the one or more rear wheels are configured as the pair of wheels.

According to this configuration, the traveling direction of the vehicle can be smoothly changed because the front wheel turns toward the turning direction more readily as compared with the case where the one or more front wheels are configured as a pair of wheels. Therefore, the driving stability of the vehicle can be improved.

Application Example 6

The vehicle according to any one of Application Examples 1 to 5, including:

a front wheel control unit for controlling the front wheel support.

According to this configuration, the driving stability of the vehicle can be improved by the front wheel control unit controlling the front wheel support.

It should be noted that the techniques disclosed in this specification can be realized in a variety of aspects, for example, a vehicle, a vehicle part, etc.

DESCRIPTION OF EMBODIMENTS

A. First Embodiment

Figure 1:
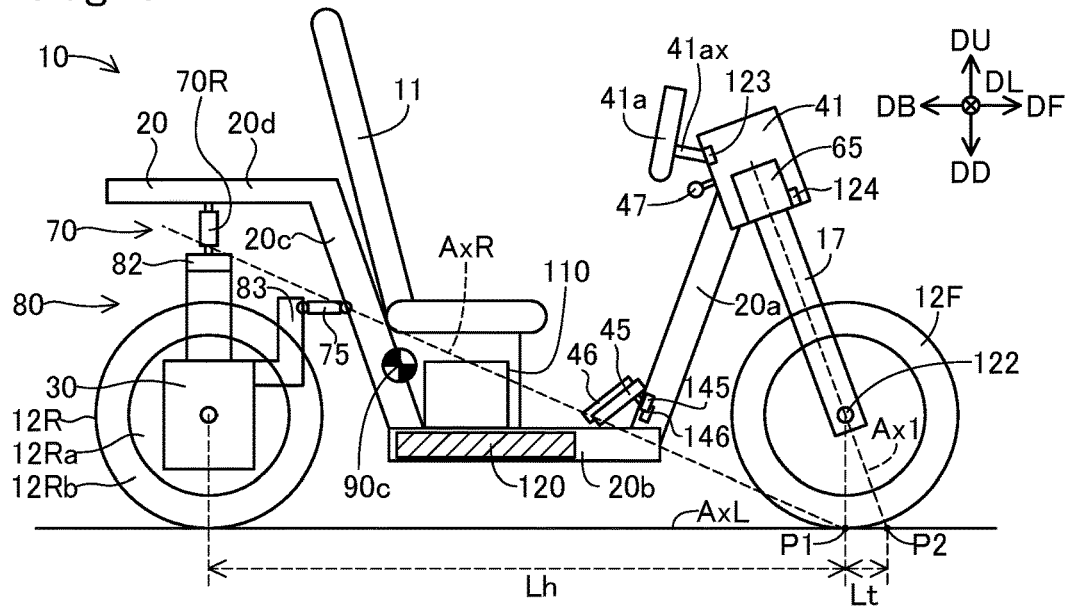
FIG. 1 is a right-side view of a vehicle 10.
Figure 2:
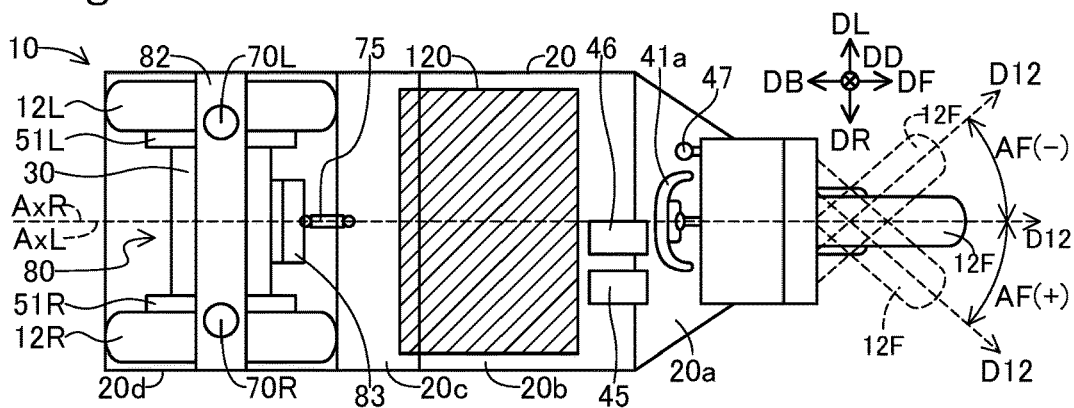
FIG. 2 is a top view of the vehicle 10.
Figure 3:
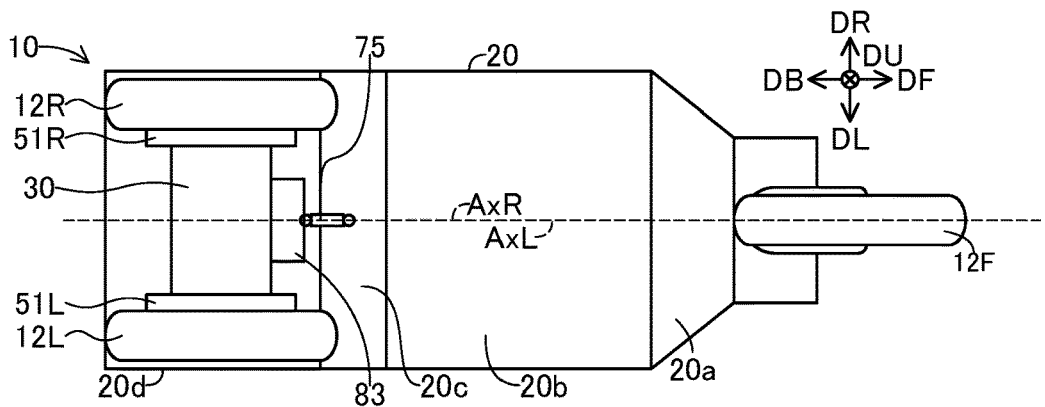
FIG. 3 is a bottom view of the vehicle 10.
Figure 4:
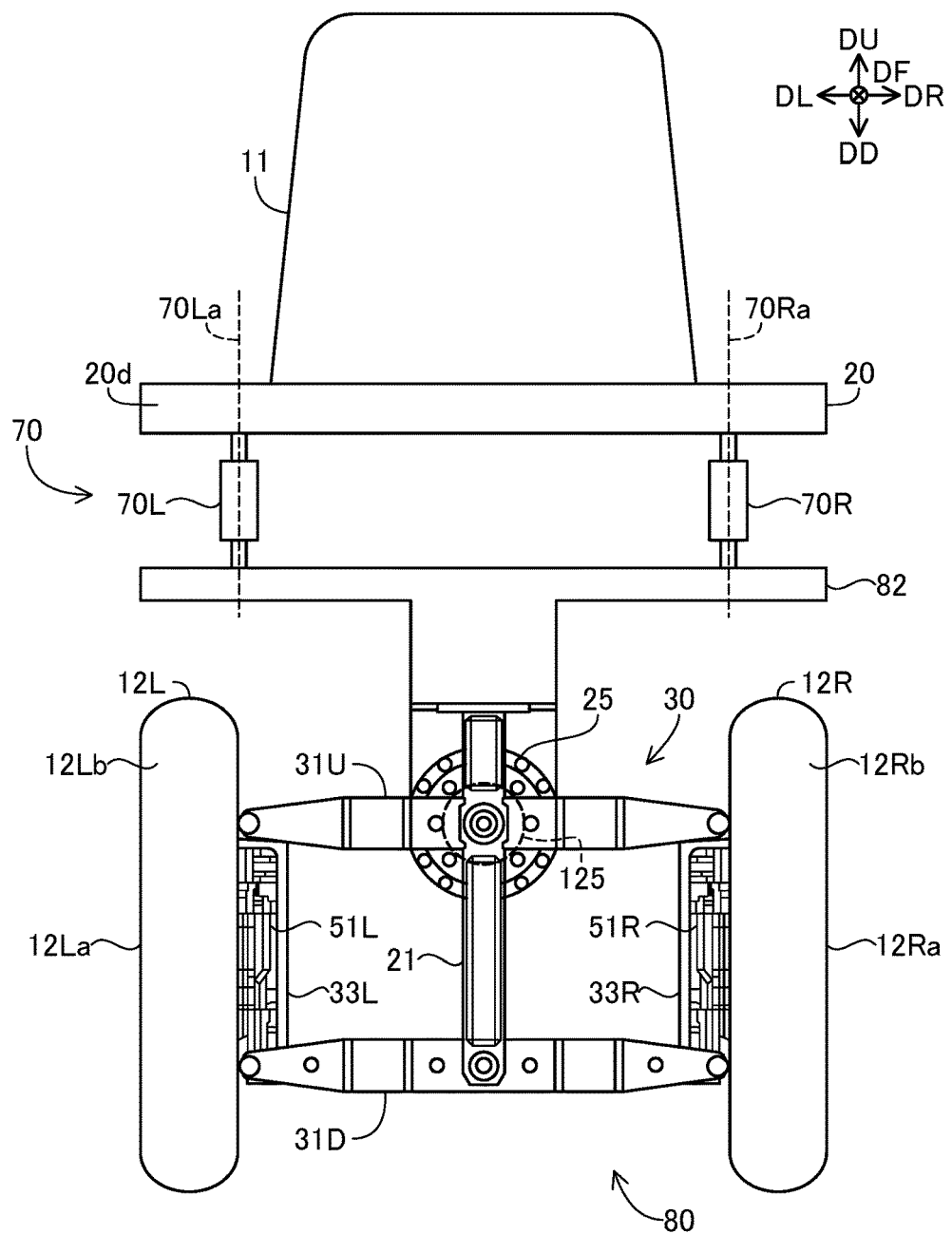
FIG. 4 is a rear view of the vehicle 10.

FIGS. 1-4 are explanatory diagrams which show a vehicle 10 as one embodiment. FIG. 1 shows a right-side view of the vehicle 10, FIG. 2 shows a top view of the vehicle 10, FIG. 3 shows a bottom view of the vehicle 10, and FIG. 4 shows a rear view of the vehicle 10. In FIGS. 2-4, only the components for use in illustration are shown that are included in the vehicle 10 configuration shown in FIG. 1, and the remaining components are omitted. In FIGS. 1-4, six directions DF, DB, DU, DD, DR, and DL are shown. The front direction DF is a direction of forward movement of the vehicle 10, and the back direction DB is opposite to the front direction DF. The upward direction DU is a vertically upward direction, and the downward direction DD is opposite to the upward direction DU. The right direction DR is a right direction viewed from the vehicle 10 traveling in the front direction DF, and the left direction DL is opposite to the right direction DR. All the directions DF, DB, DR, and DL are horizontal directions. The right and left directions DR and DL are perpendicular to the front direction DF.

The vehicle 10 (FIGS. 1 and 2) is a tricycle which includes a vehicle body 90, a single front wheel 12F rotatably coupled to the vehicle body 90, and two rear wheels 12L and 12R rotatably coupled to the vehicle body 90. The front wheel 12F is steerable, and is located at the center of the vehicle 10 in its width direction (i.e. a direction parallel to the right direction DR). The rear wheels 12L, 12R are unsteerable drive wheels, and are located symmetrically with regard to the center of the vehicle 10 in its width direction. The vehicle body 90 has a main body 20. The main body 20 has a front portion 20a, a bottom portion 20b, a rear portion 20c, and a support portion 20d. The bottom portion 20b (FIG. 2) is a plate-like portion which extends in the horizontal directions (i.e. directions perpendicular to the upward direction DU). The front portion 20a is a plate-like portion which extends obliquely from the end of the bottom portion 20b in the front direction DF side toward the front direction DF side and upward direction DU side. The rear portion 20c is a plate-like portion which extends obliquely from the end of the bottom portion 20b in the back direction DB side toward the back direction DB side and upward direction DU side. The support portion 20d is a plate-like portion which extends from the top of the rear portion 20c toward the back direction DB. For example, the main body 20 has a metal frame, and panels attached to the frame.

The vehicle body 90 further includes a seat 11 attached onto the bottom portion 20b, an accelerator pedal 45 and a brake pedal 46 located in the front direction DF side of the seat 11 on the bottom portion 20b, a controller 110 attached onto the bottom portion 20b and located below the seat surface of the seat 11, a battery 120 attached to the bottom portion 20b below the controller 110, a steering device 41 attached to the end in the front direction DF side of the front portion 20a, and a shift switch 47 attached to the steering device 41. In FIGS. 1 and 2, the battery 120 is hatched. It should be noted that other members (e.g. roof, headlight, etc.) may be attached to the main body 20 although they are not shown in the figures. The vehicle body 90 includes the members attached to the main body 20.

The accelerator pedal 45 is a pedal for accelerating the vehicle 10. An amount of pressing the accelerator pedal 45 (sometimes referred to as "accelerator operation amount") represents an acceleration force desired by the user. The brake pedal 46 is a pedal for decelerating the vehicle 10. An amount of pressing the brake pedal 46 (sometimes referred to as "brake operation amount") represents a deceleration force desired by the user. The shift switch 47 is a switch for selecting a driving mode of the vehicle 10. In this embodiment, it is possible to select a mode from among four driving modes, "drive," "neutral," "reverse," and "parking." The "drive" mode is a mode for moving forward by driving the drive wheels 12L, 12R, the "neutral" mode is a mode in which the drive wheels 12L, 12R can rotate freely, the "reverse" mode is a mode for moving backward by driving the drive wheels 12L, 12R, the "parking" mode is a mode in which at least one wheel (e.g. rear wheels 12L. 12R) cannot rotate.

The steering device 41 is a device that rotatably supports front wheel 12F, and that supports the front wheel 12F so that it can be turned about a turning axis Ax1 to the turning direction of the vehicle 10. The steering device 41 includes a front fork 17 rotatably supporting the front wheel 12F, a steering wheel 41a as an operation input unit to which the user inputs his/her desired turning direction and operation amount, a steering motor 65 for turning the front fork 17 (i.e. front wheel 12F) about the turning axis Ax1.

For example, the front fork 17 is a telescopic fork with a built-in suspension (coil spring and shock absorber). For example, the steering motor 65 is an electric motor having a stator and a rotor. The stator of the steering motor 65 is attached to the main body 20, and the rotor of the steering motor 65 is attached to the front fork 17.

It is possible to adopt as the shape of the steering wheel 41a any shape such as U-shaped, circular, and rod-shaped. The steering wheel 41a can rotate about a supporting rod 41ax which extends along the rotational axis of the steering wheel 41a. The rotational direction of the steering wheel 41a (right or left) represents a turning direction desired by the user. The operation amount of the steering wheel 41a with respect to a predetermined orientation corresponding to the straight movement (i.e. rotational angle; hereinafter referred to as "steering wheel angle") represents the magnitude of steering angle AF (FIG. 2). The steering angle AF is an angle with respect to the front direction DF of a direction D12 in which the front wheel 12F rolls when the vehicle 10 is viewed in the downward direction DD. This direction D12 is perpendicular to the rotational axis of the front wheel 12F. In this embodiment, "AF=0" indicates that "direction D12=front direction DF," "AF>0" indicates that the direction D12 is deflected toward the right direction DR side, and "AF<0" indicates that the direction D12 is deflected toward the left direction DL side. The controller 110 (FIG. 1) can control the steering motor 65 so that the orientation of the front fork 17 (i.e. the steering angle AF of the front wheel 12F (FIG. 2)) is changed according to the orientation of the steering wheel 41a when the user changes the orientation of the steering wheel 41a.

In addition, the operation modes of the steering device 41 include a first mode in which the front wheel 12F is turnably supported regardless of the state of the steering wheel 41a, and a second mode in which the steering angle AF is controlled by the steering motor 65. The first mode can be achieved in any way. For example, by stopping the power supply to the steering motor 65, the front wheel 12F is freed from the control of the steering motor 65 to turn freely. Alternatively, the steering motor 65 may be coupled to the front fork 17 via a clutch. By disengaging the clutch, the front wheel 12F is freed from the control of the steering motor 65 to turn freely.

The two rear wheels 12L, 12r are rotatably supported by a rear wheel support 80. The rear wheel support 80 (FIG. 4) includes a link mechanism 30, a lean motor 25 mounted on the top of the link mechanism 30, a first support portion 82 attached onto the top of the link mechanism 30, and a second support portion 83 attached to the front of the link mechanism 30 (FIG. 1). In FIG. 1, for purposes of illustration, portions of the link mechanism 30, first support portion 82, and second support portion 83 which are hidden by the rear wheel 12R are also depicted in solid lines. In FIG. 2, for purposes of illustration, the rear wheel support 80, rear wheels 12L, 12R, and connector 75 which are hidden by the main body 20 are depicted in solid lines. In FIGS. 1-3, the link mechanism 30 is depicted simply.

The first support portion 82 (FIG. 4) is located in the upward direction DU side of the link mechanism 30. The first support portion 82 includes a plate-like section which extends parallel to the right direction DR from a location in the upward direction DU side of the left rear wheel 12L to a location in the upward direction DU side of the right rear wheel 12R. The second support portion 83 (FIG. 1, FIG. 2) is located in the front direction DF side of the link mechanism 30 between the left rear wheel 12L and the right rear wheel 12R.

The right rear wheel 12R includes a wheel 12Ra with a rim (FIG. 1), and a tire 12Rb mounted on the rim of the wheel 12Ra. A right electric motor 51R is attached to the wheel 12Ra (FIG. 4). The right electric motor 51R has a stator and a rotor (not shown). The rotor of the right electric motor 51R is secured to the wheel 12Ra. The rotational axis of the rotor of the right electric motor 51R is the same as that of the wheel 12Ra, and is parallel to the right direction DR. The stator of the right electric motor 51R is secured to the rear wheel support 80. The configuration of the left rear wheel 12L is similar to that of the right rear wheel 12R. Specifically, the left rear wheel 12L has a wheel 12La and a tire 12Lb. A left electric motor 51L is attached to the wheel 12La. The rotor of the left electric motor 51L is secured to the wheel 12La, and the stator of the left electric motor 51L is secured to the rear wheel support 80. These electric motors 51L, 51R are in-wheel motors which directly drive the rear wheels 12L, 12R.

As shown in FIG. 4, the link mechanism 30 includes three longitudinal link members 33L, 21, 33R arranged in order toward the right direction DR, and two lateral link members 31U, 31D arranged in order toward the downward direction DD. The longitudinal link members 33L, 21, 33R are parallel to the vertical direction when the vehicle 10 is stopped. The lateral link members 31U, 31D are parallel to the horizontal direction when the vehicle 10 is stopped. The two longitudinal link members 33L, 33R, and the two lateral link members 31U, 31D form a parallelogram link mechanism. The left electric motor 51L is attached to the left longitudinal link member 33L. The right electric motor 51R is attached to the right longitudinal link member 33R. The upper lateral link member 31U couples the upper ends of the longitudinal link members 33L, 33R. The lower lateral link member 31D couples the lower ends of the longitudinal link members 33L, 33R. The center longitudinal link member 21 couples the centers of the lateral link members 31U, 31D. These link members 33L, 33R, 31U, 31D, 21 are rotatable at their coupling portions, and their rotational axes are parallel to the front direction DF. On the top of the center longitudinal link member 21, the first support portion 82 and second support portion 83 (FIG. 1) are secured. The link members 33L, 21, 33R, 31U, 31D, and the support portions 82, 83 are, for example, made from metal.

For example, the lean motor 25 is an electric motor having a stator and a rotor. The stator of the lean motor 25 is secured to the center longitudinal link member 21, and the rotor of the lean motor 25 is secured to the upper lateral link member 31U. Instead, the rotor may be secured to the center longitudinal link member 21, and the stator may be secured to the upper lateral link member 31U. The rotational axis of the lean motor 25 is the same as that of the coupling portion of the upper lateral link member 31U and center longitudinal link member 21. The rotational axis of the lean motor 25 is located at the center of the vehicle 10 in its width direction, and is parallel to the front direction DF. When the lean motor 25 rotates its rotor, the upper lateral link member 31U is tilted with respect to the center longitudinal link member 21. This causes the vehicle 10 to lean.

Figure 5:
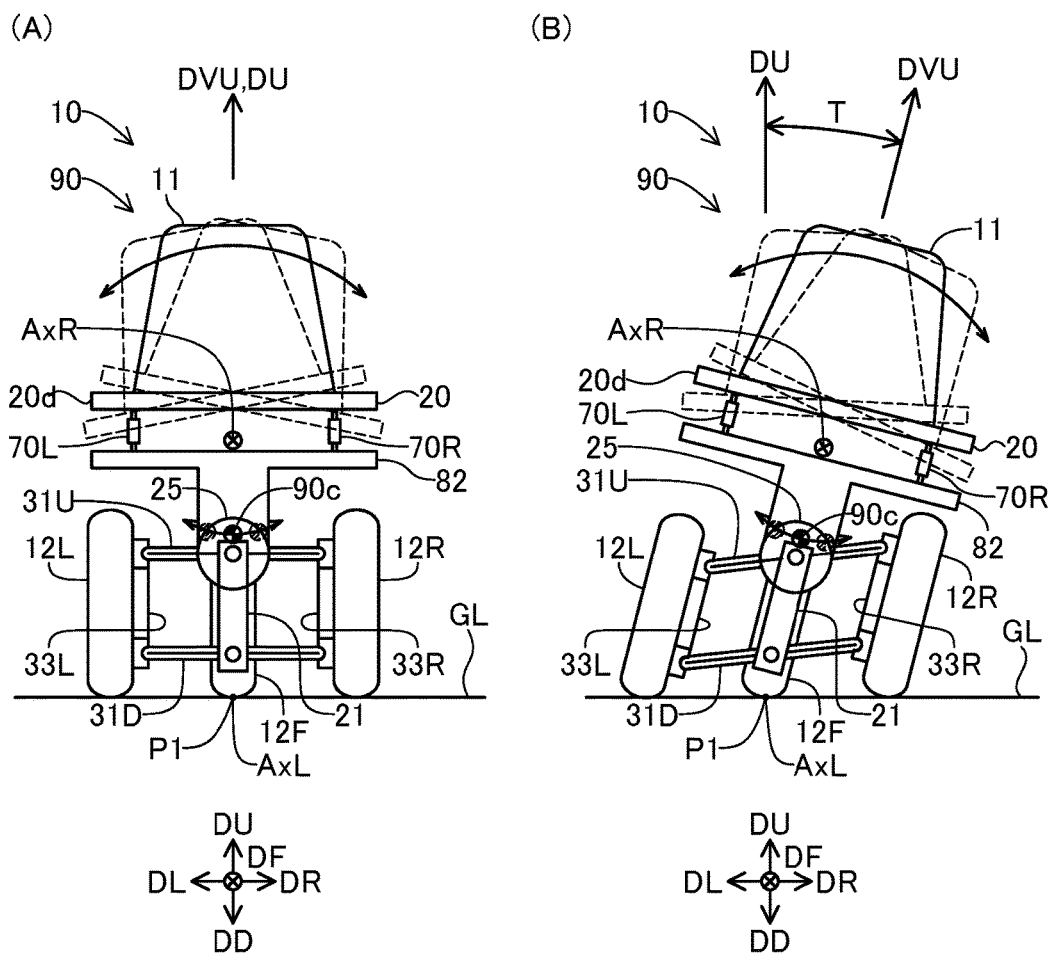
FIGS. 5(A) and 5(B) are schematic diagrams showing states of the vehicle 10.

FIG. 5 shows a schematic diagram of the states of the vehicle 10. This figure shows simplified rear views of the vehicle 10. FIG. 5(A) shows the state in which the vehicle 10 stands upright while FIG. 5(B) shows the state in which the vehicle 10 leans. As shown in FIG. 5(A), when the upper lateral link member 31U is perpendicular to the center longitudinal link member 21, all of the wheels 12F, 12L, 12R stand upright relative to the flat ground GL. Also, the whole vehicle 10 including the vehicle body 90 stands upright relative to the ground GL. A vehicle upward direction DVU in the figure represents the upward direction of the vehicle 10. With the vehicle 10 not leaning, the vehicle upward direction DVU is the same as the upward direction DU. It should be noted that the vehicle body 90 is rotatable relative to the rear wheel support 80 as described later. In this embodiment, therefore, the orientation of the rear wheel support 80 (specifically, the orientation of the center longitudinal link member 21 which is the basis of movement of the link mechanism 30) is adopted as the vehicle upward direction DVU.

As shown in FIG. 5(B), when the upper lateral link member 31U is tilted relative to the center longitudinal link member 21, one of the right rear wheel 12R and left rear wheel 12L moves in the vehicle upward direction DVU side while the other moves in an opposite direction side to the vehicle upward direction DVU. As a result, these wheels 12F, 12L, 12R lean relative the ground GL while all of the wheels 12F, 12L, 12R have contact with the ground GL. Also, the whole vehicle 10 including the vehicle body 90 leans relative to the ground GL. In the example of FIG. 5(B), the right rear wheel 12R moves in the vehicle upward direction DVU side while the left rear wheel 12L moves in the opposite direction side. As a result, the wheels 12F, 12L, 12R, and thus the whole vehicle 10 including the vehicle body 90 lean to the right direction DR side. As described later, when the vehicle 10 turns to the right direction DR side, the vehicle 10 leans to the right direction DR side. When the vehicle 10 turns to the left direction DL side, the vehicle 10 leans to the left direction DL side.

In FIG. 5(B), the vehicle upward direction DVU is tilted in the right direction DR side relative to the upward direction DU. Hereinafter, when the vehicle 10 is viewed in the front direction DF, the angle between the upward direction DU and the vehicle upward direction DVU is referred to as lean angle T. Where "T>0" indicates a lean to the right direction DR side while "T<0" indicates a lean to the left direction DL side. When the vehicle 10 leans, the vehicle body 90 also leans to substantially the same direction. The lean angle T of the vehicle 10 can be considered as the lean angle T of the vehicle body 90.

The lean motor 25 has a lock mechanism (not shown) for unrotatably locking the lean motor 25. By operating the lock mechanism, the upper lateral link member 31U is unrotatably locked relative to the center longitudinal link member 21. As a result, the lean angle T is fixed. Preferably, the lock mechanism is a mechanical mechanism which consumes no electric power when locking the lean motor 25 (and thus the link mechanism 30).

As shown in FIGS. 5(A) and (B), a lean axis AxL is located on the ground GL. The vehicle 10 can lean to right and left about the lean axis AxL. The lean axis AxL extends from the back direction DB side toward the front direction DF side. In this embodiment, the lean axis AxL is a straight line which passes through a contact point P1 between the front wheel 12F and the ground GL, and which is parallel to the front direction DF. The contact point P1 is a gravity center position of the ground contact surface of the front wheel 12F (i.e. the contact area between the front wheel 12F and the ground GL). The gravity center of the area is a position of gravity center on the assumption that its mass is distributed evenly across the area. As described later, when the vehicle 10 turns, the lean motor 25 causes the vehicle 10 to lean toward the turning direction side (i.e. center side of turning). This stabilizes the turning of the vehicle 10. In this manner, the link mechanism 30 for rotatably supporting the rear wheels 12L, 12R, and the lean motor 25 as an actuator for actuating the link mechanism 30 constitute a lean angle changing unit which changes, about the lean axis AxL, the lean angle T of the vehicle body 90 in the width direction.

The vehicle body 90 (main body 20 in this case) is coupled to the rear wheel support 80 rotatably about a roll axis AxR, as shown in FIGS. 1 and 4. In this embodiment, the main body 20 is coupled to the rear wheel support 80 via a suspension system 70 and the connector 75. The roll axis AxR extends from the back direction DB side toward the front direction DF side. As shown in FIGS. 2 and 4, the suspension system 70 has a left suspension 70L and a right suspension 70R. In this embodiment, each of the suspensions 70L, 70R is a telescopic suspension with built-in coil spring and shock absorber. Each suspension 70L, 70R can extend or retract along a central axis 70La, 70Ra (FIG. 4) of each suspension 70L, 70R. When the vehicle 10 stands upright as shown in FIG. 4, the axis of each suspension 70L, 70R is approximately parallel to the vertical direction. The upper ends of the suspensions 70L, 70R are coupled to the support portion 20d of the main body 20 rotatably about an axis parallel to a first axis direction (e.g. the front direction DF). The lower ends of the suspensions 70L, 70R are coupled to the first support portion 82 of the rear wheel support 80 rotatably about an axis parallel to a second axis direction (e.g. the right direction DR). The second axis direction may be different from the first axis direction (e.g. perpendicular to the first axis direction). Alternatively, the second axis direction may be parallel to the first axis direction. In addition, the coupling portions between the suspensions 70L, 70R and the other members may be configured as ball-and-socket joint.

The connector 75 is a rod which extends in the front direction DF as shown in FIGS. 1 and 2. The connector 75 is located at the center of the vehicle 10 in its width direction. The end of the connector 75 in the front direction DF side is coupled to the rear portion 20c of the main body 20. The coupling portion is configured as ball-and-socket joint. The connector 75 can move in any direction relative to the rear portion 20c within a predetermined range. In addition, the connector 75 can rotate about the central axis of the connector 75 relative to the rear portion 20c. The end of the connector 75 in the back direction DB side is coupled to the second support portion 83 of the rear wheel support 80. The coupling portion is configured as ball-and-socket joint. The connector 75 can move in any direction relative to the second support portion 83 within a predetermined range, and can also rotate about the central axis of the connector 75 relative to the second support portion 83.

In this manner, the main body 20 (and thus the vehicle body 90) is coupled to the rear wheel support 80 via the suspension system 70 and the connector 75. The vehicle body 90 is movable relative to the rear wheel support 80. The roll axis AxR of FIG. 1 represents a central axis about which the vehicle body 90 rotates relative to the rear wheel support 80 in the right direction DR or left direction DL. In this embodiment, the roll axis AxR is a straight line which passes through the contact point P1 between the front wheel 12F and the ground GL, and through the vicinity of the connector 75. The vehicle body 90 can rotate about the roll axis AxR through the extension/retraction of the suspensions 70L, 70R.

In FIGS. 5(A) and (B), the vehicle body 90 which rotates about the roll axis AxR is shown in dotted lines. The roll axis AxR in this figure represents a roll axis AxR on a plane which includes the suspensions 70L, 70R, and which is perpendicular to the front direction DF. As shown in FIG. 5(B), the vehicle body 90 can also rotate about the roll axis AxR to the right direction DR and to the left direction DL even when the vehicle 10 leans.

Figure 6:
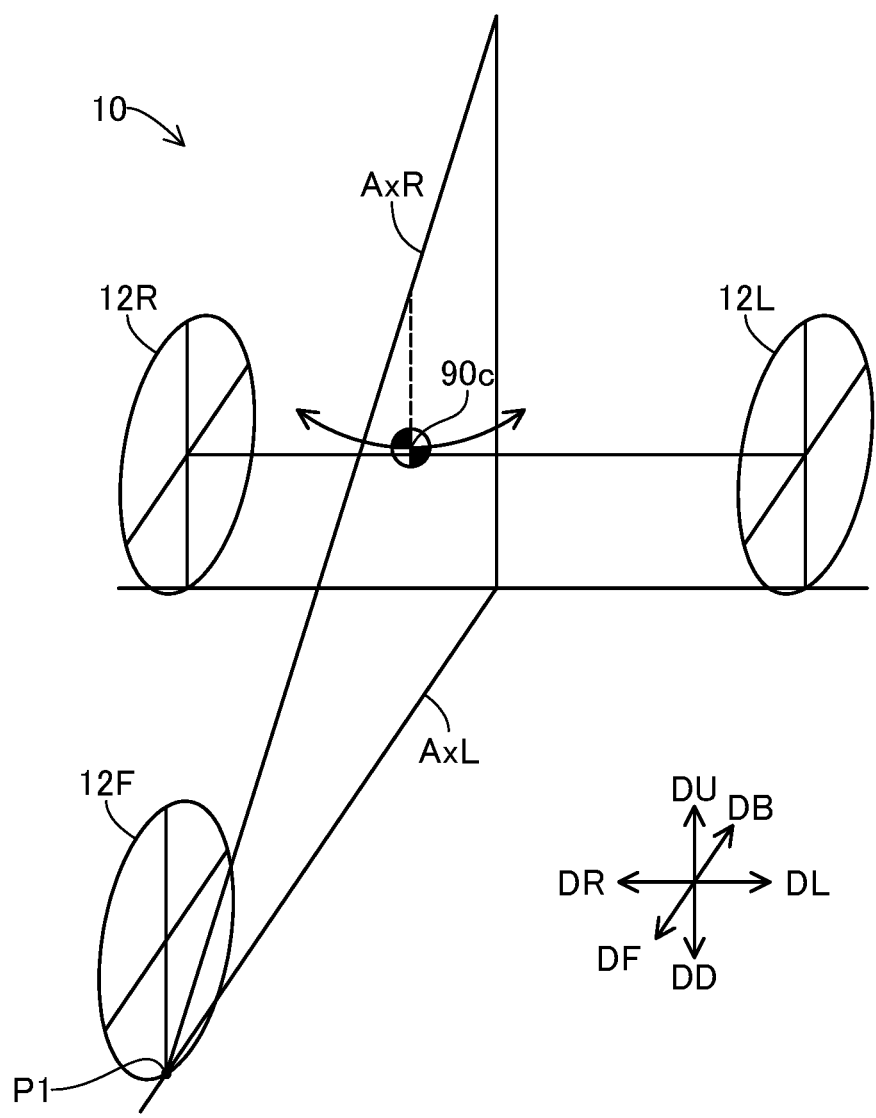
FIG. 6 is a perspective view showing a positional relationship between the roll axis AxR and the gravity center 90c of the vehicle body 90.

FIG. 6 is a perspective view showing a positional relationship between the roll axis AxR and the gravity center 90c of the vehicle body 90. This figure shows the roll axis AxR, the gravity center 90c, the lean axis AxL, and simplified wheels 12F, 12L, 12R. This gravity center 90c is a gravity center of the vehicle body 90 under a full load condition. The full load condition means that the vehicle 10 carries an occupant (and possibly a load) so that the gross weight of the vehicle 10 becomes the acceptable gross weight. For example, no maximum loading weight may be specified, but a maximum riding capacity may be specified. In this case, the gravity center 90c is a gravity center when the vehicle 10 is filled to its maximum riding capacity. A reference body weight (e.g. 55 kg) preset corresponding to the maximum riding capacity is adopted as occupant's body weight. Alternatively, a maximum loading weight may be specified in addition to a maximum riding weight. In this case, the gravity center 90c is a gravity center of the vehicle body 90 when the vehicle 10 is filled to its maximum riding capacity and maximum loading capacity.

As shown in FIGS. 1 and 6, the gravity center 90c is located below the roll axis AxR. Specifically, on a plane having the same location as the gravity center 90c in the front direction DF (i.e. on a plane which includes the gravity center 90c and is perpendicular to the front direction DF), the gravity center 90c is located in the downward direction DD side of the roll axis AxR. Therefore, falling of the vehicle body 90 to the left direction DL or right direction DR is suppressed when the vehicle body 90 rotates about the roll axis AxR. For example, in the state shown in FIG. 5(A), when the vehicle body 90 rotates about the roll axis AxR to the right direction DR side, the gravity center 90c moves obliquely upward in the left direction DL side of the roll axis AxR. When the vehicle body 90 is tilted in this manner, the weight of the vehicle body 90 acts to restore to a lower position (in this case, the original position) the gravity center 90c which has moved obliquely upward. Therefore, the vehicle body 90 tilted to the right direction DR side will return to its original position. In the same manner, the weight of the vehicle body 90 will also act to restore to the original position the vehicle body 90 which is tilted to the left direction DL side when the vehicle body 90 rotates to the left direction DL side. In this manner, falling of the vehicle body 90 about the roll axis AxR to the left direction DL or right direction DR is suppressed.

As shown in FIG. 5(B), the gravity center 90c is located below the roll axis AxR in the same manner when the vehicle 10 leans. Therefore, falling of the vehicle body 90 about the roll axis AxR to the left direction DL or right direction DR is suppressed. It should be noted that in this embodiment, when the vehicle 10 turns, the vehicle 10 leans toward the center side of turning. A centrifugal force acts on the vehicle body 90 in addition to its own weight. With the weight and the centrifugal force in equilibrium, the vehicle body 90 can lean relative to the ground GL toward the center side of turning.

In this embodiment, the battery 120, which is a relatively heavy element among the elements of the vehicle body 90 (FIG. 1), is located in a lower position in order to make the gravity center 90c lower than the roll axis AxR. Specifically, the battery 120 is secured to the bottom portion 20b, which is the lowest portion among the main body 20 of the vehicle body 90. Therefore, the gravity center 90c can be easily made lower than the roll axis AxR.

Figure 7:
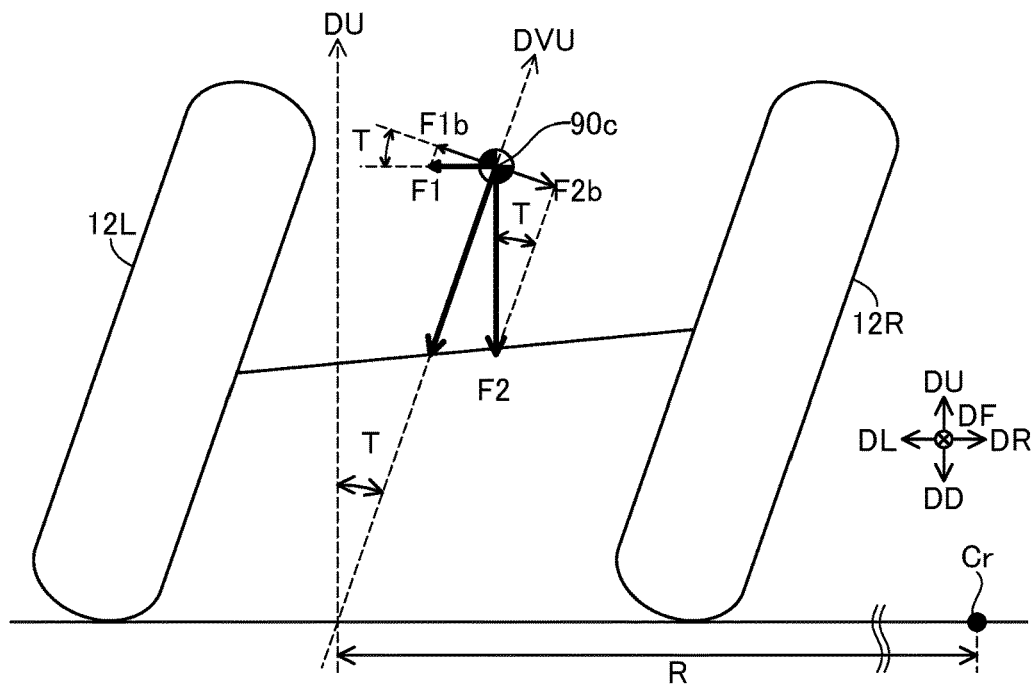
FIG. 7 is an explanatory diagram showing a balance of forces during turning.

FIG. 7 is an explanatory diagram showing a balance of forces during turning. This figure shows a rear view of the rear wheels 12L, 12R during turning to right. As described later, when the turning direction is the right direction, the controller 110 can control the lean motor 25 so that the rear wheels 12L, 12R (and thus the vehicle 10) lean relative to the ground GL to the right direction DR.

A first force F1 in the figure is a centrifugal force acting on the vehicle body 90. A second force F2 is a gravity acting on the vehicle body 90. Where the mass of the vehicle body 90 is m (kg), the acceleration of gravity is g (about 9.8 m/s$^2$), the lean angle of the vehicle 10 relative to the vertical direction is T (degree), the velocity of the vehicle 10 during turning is V (m/s), and the turning radius is R (m). The first force F1 and the second force F2 are expressed in Equations 1 and 2, respectively:

$F1=(mV^2)/R$ (Equation 1)

$F2=mg$ (Equation 2)

In addition, a force F1b in the figure is a component of the first force F1 in a direction perpendicular to the vehicle upward direction DVU. A force F2b is a component of the second force F2 in a direction perpendicular to the vehicle upward direction DVU. The force F1b and the force F2b are expressed in Equations 3 and 4, respectively:

$F1b=F1\cos(T)$ (Equation 3)

$F2b=F2\sin(T)$ (Equation 4)

The force F1b is a component which causes the vehicle upward direction DVU to be rotated to the left direction DL side while the force F2b is a component which causes the vehicle upward direction DVU to be rotated to the right direction DR side. When the vehicle 10 continues to turn stably with the lean angle T (and furthermore the velocity V and turning radius R) maintained, the relationship between F1b and F2b is expressed in the following equation 5:

$F1b=F2b$ (Equation 5)

By substituting Equations 1-4 as discussed above into Equation 5, the turning radius R is expressed in Equation 6:

$R=V^2/(g\tan(T))$ (Equation 6)

Equation 6 is established independently of the mass m of the vehicle body 90.

Figure 8:
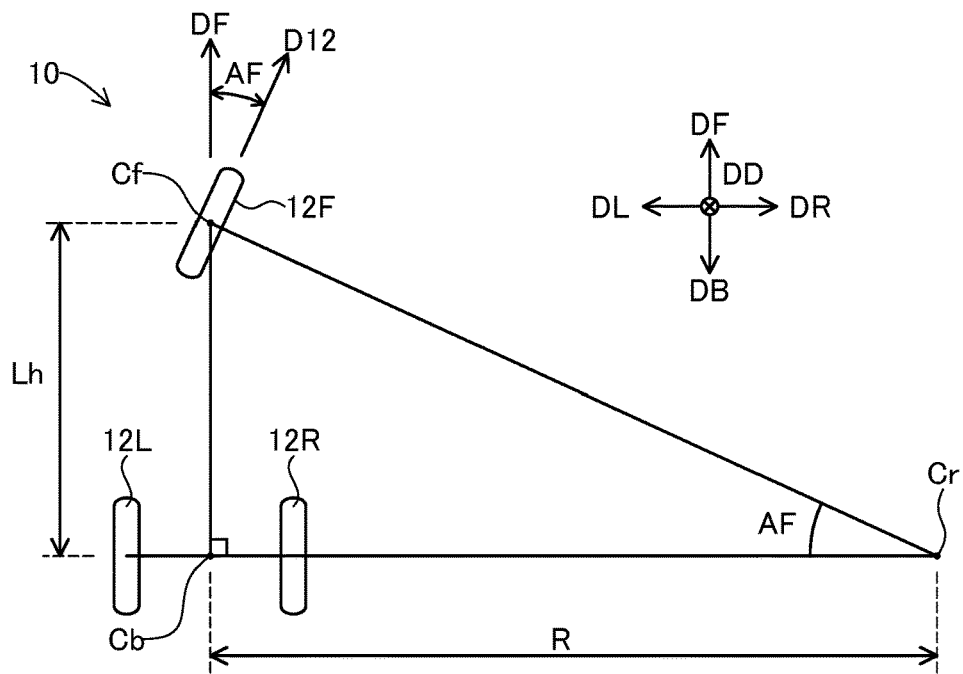
FIG. 8 is an explanatory diagram showing a simplified relationship between the steering angle AF and the turning radius R.

FIG. 8 is an explanatory diagram showing a simplified relationship between the steering angle AF and the turning radius R. This figure shows the wheels 12F, 12L, 12R viewed in the downward direction DD. In the figure, the front wheel 12F turns to the right direction DR, and thus the vehicle 10 turns to the right direction DR. A front center Cf in the figure is the center of the front wheel 12F. The front center Cf is located on the rotational axis of the front wheel 12F. The front center Cf is located at the approximately same position as the contact point P1 (FIG. 1). A rear center Cb is the center between the two rear wheels 12L, 12R. The rear center Cb is located at the middle between the rear wheels 12L, 12R on the rotational axis of the rear wheels 12L, 12R. A center Cr is the turning center (referred to as turning center Cr). A wheelbase Lh is the distance between the front center Cf and the rear center Cb in the front direction DF. As shown in FIG. 1, the wheelbase Lh is the distance between the rotational axis of the front wheel 12F and that of the rear wheels 12L, 12R in the front direction DF.

As shown in FIG. 8, the front center Cf, rear center Cb, and turning center Cr form a right-angled triangle. The internal angle of the vertex Cb is 90 degrees. The internal angle of the vertex Cr is equal to the steering angle AF. Therefore, the relationship between the steering angle AF and the turning radius R is expressed in Equation 7:

$AF=\arctan(Lh/R)$ (Equation 7)

It should be noted that there are a variety of difference between the actual behavior of the vehicle 10 and the simplified behavior in FIG. 8. For example, the actual wheels 12F, 12L, 12R can slip relative to the ground GL. In addition, the actual rear wheels 12L, 12R lean. Therefore, the actual turning radius may be different from the turning radius R in Equation 7. However, Equation 7 can be used as a good approximate equation which represents the relationship between the steering angle Af and the turning radius R.

As shown in FIG. 1, in this embodiment, the turning axis Ax1 of the steering device 41 is tilted obliquely relative to the ground GL, and specifically a direction which is parallel to the turning axis Ax1 and faces the downward direction DD side extends obliquely forward. Therefore, the intersection point P2 between the turning axis Ax1 of the steering device 41 and the ground GL is located in the front direction DF side of the contact point P1 of the front wheel 12F with the ground GL. The distance Lt in the front direction DF between these points P1, P2 is referred to as a trail. A positive trail Lt indicates that the contact point P1 is located in the back direction DB side of the intersection point P2.

In this embodiment, the vehicle 10 has a positive trail Lt. Therefore, when the vehicle 10 leans as shown in FIG. 5(B) during its forward movement, the front wheel 12F can spontaneously turn to the lean direction of the vehicle 10 (right direction DR in the example of FIG. 5(B)). When the steering device 41 operates in the first mode (the front wheel 12F is turnable), the front wheel 12F spontaneously turns to the lean direction following beginning of change in the lean angle T. Thus, the vehicle 10 turns toward the lean direction.

In addition, the lean angle T is stable, and thus the behavior of the vehicle 10 is stabilized because the forces F1b, F2b (FIG. 7, Equation 5) balance each other when the turning radius is equal to the turning radius R expressed in Equation 6 discussed above. The vehicle 10 turning at the lean angle T will turn in the turning radius R expressed in Equation 6. In addition, the orientation of the front wheel 12F (steering angle AF) spontaneously faces the traveling direction of the vehicle 10 because the vehicle 10 has a positive trail Lt. Therefore, when the vehicle 10 turns at the lean angle T, the orientation of the turnable front wheel 12F (steering angle AF) can settle at an orientation of the steering angle AF specified based on the turning radius R expressed in Equation 6, and Equation 7.

In the above description, the vehicle 10 leans to the right direction DR side. The above discussion is also applicable to the case where the vehicle 10 leans to the left direction DL side.

Figure 9:
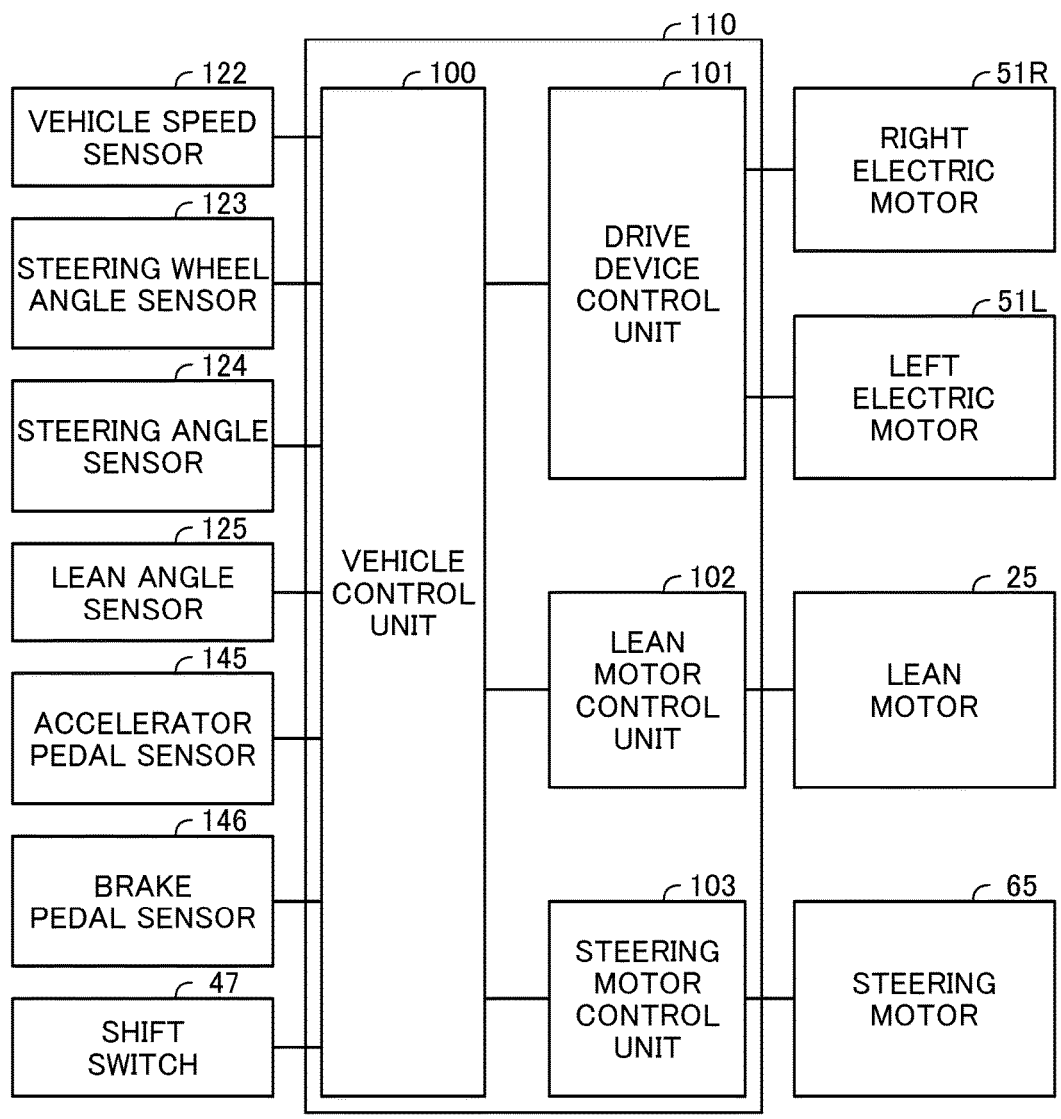
FIG. 9 is a block diagram showing the configuration relating to control of the vehicle 10.

FIG. 9 is a block diagram showing the configuration relating to control of the vehicle 10. The vehicle 10 includes as components for the control a vehicle speed sensor 122, a steering wheel angle sensor 123, a steering angle sensor 124, a lean angle sensor 125, an accelerator pedal sensor 145, a brake pedal sensor 146, a shift switch 147, a controller 110, a right electric motor 51R, a left electric motor 51L, a lean motor 25, and a steering motor 65.

The vehicle speed sensor 122 is a sensor for detecting a vehicle speed of the vehicle 10. In this embodiment, the vehicle speed sensor 122 is attached on the lower end of the front fork 17 (FIG. 1) to detect a rotational rate of the front wheel 12F, i.e. vehicle speed. The vehicle speed sensor 122 is configured using a resolver or encoder, for example.

The steering wheel angle sensor 123 is a sensor for detecting an orientation of the steering wheel 41a (i.e. steering wheel angle). "Steering wheel angle=0" indicates straight movement, "steering wheel angle >0" indicates a right turn, and "steering wheel angle <0" indicates left turn. The steering wheel angle represents a steering angle AF desired by the user, i.e. a target value of steering angle AF.

In this embodiment, the steering wheel angle sensor 123 is attached to the supporting rod 41ax of the steering wheel 41a (FIG. 1). The steering wheel angle sensor 123 is configured using a resolver or encoder, for example.

The steering angle sensor 124 is a sensor for detecting a steering angle AF of the front wheel 12F. In this embodiment, the steering angle sensor 124 is attached to the steering motor 65 (FIG. 1). The steering angle sensor 124 is configured using a resolver or encoder, for example.

The lean angle sensor 125 is a sensor for detecting a lean angle T. The lean angle sensor 125 is attached to the lean motor 25 (FIG. 4). As discussed above, the orientation of the upper lateral link member 31U relative to the center longitudinal link member 21 corresponds to the lean angle T. The lean angle sensor 125 detects the orientation of the upper lateral link member 31U relative to the center longitudinal link member 21, i.e. the lean angle T. The lean angle sensor 125 is configured using a encoder or resolver, for example.

The accelerator pedal sensor 145 is a sensor for detecting an accelerator operation amount. In this embodiment, the accelerator pedal sensor 145 is attached to the accelerator pedal 45 (FIG. 1). The brake pedal sensor 146 is a sensor for detecting a brake operation amount. In this embodiment, the brake pedal sensor 146 is attached to the brake pedal 46 (FIG. 1).

The controller 110 includes a vehicle control unit 100, a drive device control unit 101, a lean motor control unit 102, and a steering motor control unit 103. The controller 110 operates with electric power from the battery 120 (FIG. 1). The control units 100, 101, 102, 103 each has a computer. Each computer includes a processor (e.g. CPU), a volatile memory (e.g. DRAM), and a non-volatile memory (e.g. flash memory). The non-volatile memory stores in advance a program for operating the respective control unit. The processor performs a variety of processes by executing the programs.

The processor of the vehicle control unit 100 receives signals from the sensors 122, 123, 124, 125, 145, 146, and from the shift switch 47, and then controls the vehicle 10 according to the received signals. Specifically, the processor of the vehicle control unit 100 controls the vehicle 10 by outputting instructions to the drive device control unit 101, the lean motor control unit 102, and the steering motor control unit 103 (as described in detail later).

The processor of the drive device control unit 101 controls the electric motors 51L, 51R according to the instruction from the vehicle control unit 100. The drive device control unit 101 includes, in addition to its computer, an electric circuit (e.g. inverter circuit) which supplies the electric motors 51L, 51R with electric power from the battery 120 according to the instruction from the computer.

The processor of the lean motor control unit 102 controls the lean motor 25 according to the instruction from the vehicle control unit 100. The lean motor control unit 102 includes, in addition to its computer, an electric circuit (e.g. inverter circuit) which supplies the lean motor 25 with electric power from the battery 120 according to the instruction from the computer.

The processor of the steering motor control unit 103 controls the steering motor 65 according to the instruction from the vehicle control unit 100. The steering motor control unit 103 includes, in addition to its computer, an electric circuit (e.g. inverter circuit) which supplies the steering motor 65 with electric power from the battery 120 according to the instruction from the computer.

Figure 10:
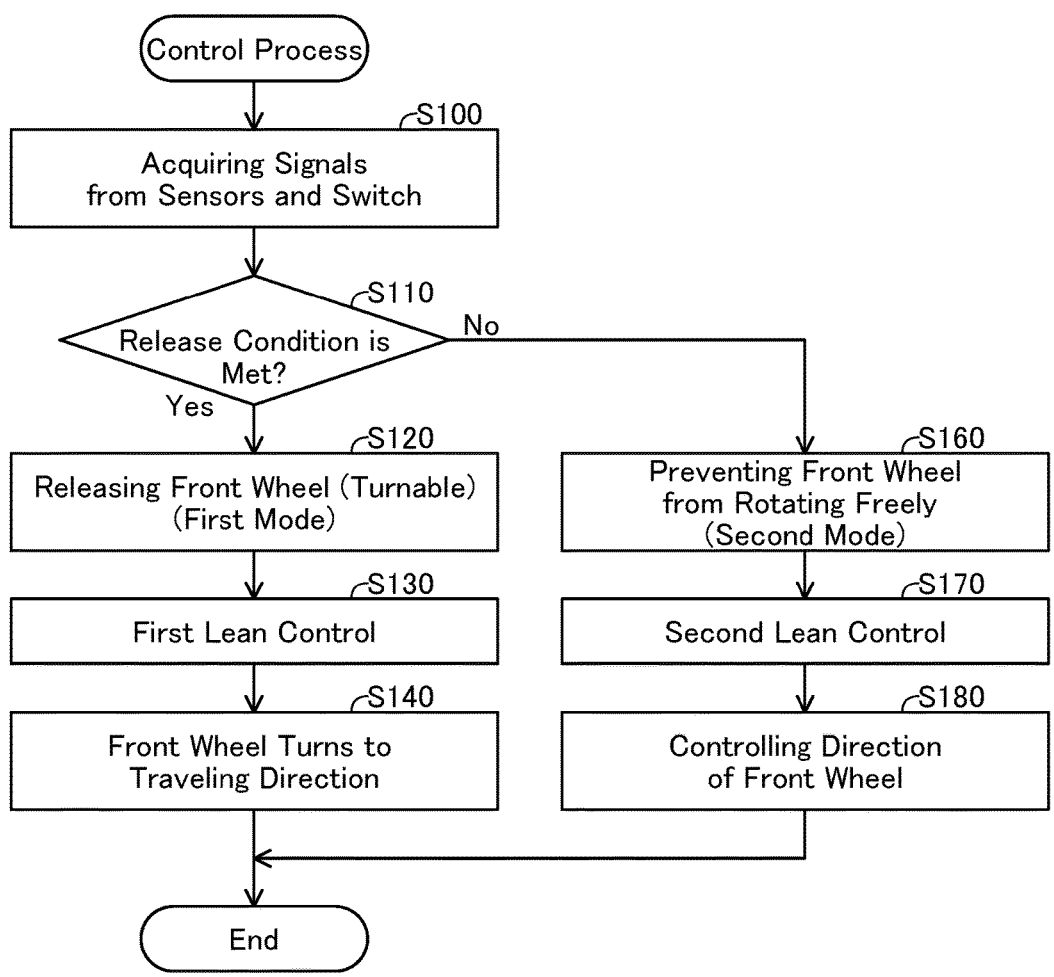
FIG. 10 is a flowchart showing an example control process.

FIG. 10 is a flowchart showing an example control process performed by the controller 110 (FIG. 9). The flowchart of FIG. 10 shows a procedure for controlling the rear wheel support 80 and the steering device 41. In the embodiment of FIG. 10, the controller 110 operates the steering device 41 in the first mode for turnably supporting the front wheel 12F during higher speed, and operates the steering device 41 in the second mode for actively controlling the front wheel 12F during lower speed. The controller 110 also perform lean control for leaning the vehicle 10 both during higher speed and during lower speed. In FIG. 10, each process step has a reference number of an alphabet "S" followed by a numeral.

In S100, the vehicle control unit 100 acquires signals from the sensors 122, 123, 124, 125, 145, 146, and from the shift switch 47. This allows the vehicle control unit 100 to identify the velocity V, steering wheel angle, steering angle AF, lean angle T, accelerator operation amount, brake operation amount, and driving mode.

In S110, the vehicle control unit 100 determines whether or not a condition (hereinafter referred to as "release condition") is met for operating the steering device 41 in the first mode (in which the front wheel 12F is turnable). In this embodiment, the release condition is that 'the driving mode is "drive" or "neutral," and the velocity V is greater than or equal to a predetermined threshold value Vth.' The threshold value Vth is 15 km/h, for example.

If the release condition is met (S110: Yes), in S120, the vehicle control unit 100 supplies the steering motor control unit 103 with an instruction for operating the steering device 41 in the first mode. The steering motor control unit 103 stops the power supply to the steering motor 65 according to the instruction. This causes the steering motor 65 to become rotatable, and thus the steering device 41 turnably supports the front wheel 12F. In this manner, the vehicle control unit 100 and the steering motor control unit 103 serve as a front wheel control unit for controlling the steering device 41.

In S130, the vehicle control unit 100 identifies a first target lean angle T1 mapped to the steering wheel angle. In this embodiment, the first target lean angle T1 is an value obtained by multiplying the steering wheel angle (in degree) by a predetermined coefficient (e.g. 30/60). It should be noted that instead of the proportional relationship, a variety of relationships such that the larger the absolute value of steering wheel angle is, the larger is the absolute value of first target lean angle T1 may be adopted as a correspondence between the steering wheel angle and the first target lean angle T1. Information which represents the correspondence between the steering wheel angle and the first target lean angle T1 is stored in advance within the non-volatile memory of the vehicle control unit 100. The vehicle control unit 100 references to this information to identify the first target lean angle T1 corresponding to the steering wheel angle according to the predetermined correspondence in the referenced information.

It should be noted that as described above, Equation 6 represents the correspondence among the lean angle T, the velocity V, and the turning radius R, and Equation 7 represents the correspondence between the turning radius R and the steering angle AF. These Equations 6 and 7 can be combined to identify the correspondence among the lean angle T, the velocity V, and the steering angle AF. It may be considered that the correspondence between the steering wheel angle and the first target lean angle T1 maps the steering wheel angle to the steering angle AF via the correspondence among the lean angle T, the velocity V, and the steering angle AF (where the steering angle AF can be vary depending upon the velocity V).

The vehicle control unit 100 supplies the lean motor control unit 102 with an instruction for controlling the lean motor 25 so that the lean angle T is equal to the first target lean angle T1. According to the instruction, the lean motor control unit 102 drives the lean motor 25 so that the lean angle T is equal to the first target lean angle T1. This causes the lean angle T of the vehicle 10 to be changed to the first target lean angle T1 mapped to the steering wheel angle. In this manner, the vehicle control unit 100 and the lean motor control unit 102 serve as a lean control unit for controlling the link mechanism 30 and lean motor 25 which change the lean angle T.

In subsequent S140, as described above, the front wheel 12F spontaneously turns to a direction of the steering angle AF calculated based on the turning radius R expressed in Equation 6, and Equation 7. The front wheel 12F begins to spontaneously turn after beginning of change in the lean angle T. Then, the process of FIG. 10 ends. The controller 110 repeatedly performs the process of FIG. 10. If the release condition is met, the controller 110 continues to operate the steering device 41 in the first mode, and control the lean angle T in S130. As a result, the vehicle 10 runs toward a traveling direction appropriate to the steering wheel angle.

If the release condition is not met (S110: No), the vehicle control unit 100 proceeds to S160. It should be noted that in this embodiment, any of the following cases does not meet the release condition: 1) the driving mode is "drive" or "neutral," and the velocity V is less than the predetermined threshold value Vth; 2) the driving mode is "parking"; and 3) the driving mode is "reverse."

In S160, the vehicle control unit 100 supplies the steering motor control unit 103 with an instruction for operating the steering device 41 in the second mode. In this embodiment, the steering motor control unit 103 supplies power to the steering motor 65 according to the instruction. The front wheel 12F (steering angle AF) is prevented by the steering motor from being free to turn.

In S170, the vehicle control unit 100 calculates a second target lean angle T2 from the first target lean angle T1 mapped to the steering wheel angle, and the velocity V. In this embodiment, the second target lean angle T2 is expressed by Equation 8:

$$T2=(V/Vth)T1 \qquad \text{(Equation 8)}$$

The second target lean angle T2 is proportional to V. As the velocity V changes from 0 to the threshold value Vth, the second target lean angle T2 changes from 0 to the first target lean angle T1 in proportion to the velocity V.

In this manner, if the release condition is not met, in particular, if the velocity V is lower than the threshold value Vth, the absolute value of the second target lean angle T2 is smaller than that of the first target lean angle T1 during higher speed. The reason is as follows. During lower speed, the traveling direction tends to be changed more frequently than during higher speed. Therefore, during lower speed, by making the absolute value of the lean angle T smaller, it is possible to drive more stably even if changing the traveling direction frequently. On the other hand, during higher speed, the vehicle 10 can be turned more stably by adopting the first target lean angle T1. It should be noted that the second target lean angle T2 may be unproportional to the velocity V. The second target lean angle T2 may change in a stepwise manner with the change in velocity V. Alternatively, the second target lean angle T2 may change in a curved manner with the change in velocity V. In general, it is preferable that the higher the velocity V is, the larger the absolute value of the second target lean angle T2 is.

The vehicle control unit 100 supplies the lean motor control unit 102 with an instruction for controlling the lean motor 25 so that the lean angle T is equal to the second target lean angle T2. According to the instruction, the lean motor control unit 102 drives the lean motor 25 so that the lean angle T is equal to the second target lean angle T2. This causes the lean angle T of the vehicle 10 to be changed to the second target lean angle T2.

In S180 after beginning to change the lean angle T (S170), the vehicle control unit 100 calculates a target steering angle AFt, and then supplies the steering motor control unit 103 with an instruction for controlling the steering motor 65 so that the steering angle AF is equal to the target steering angle AFt (the target steering angle AFt will be described later). According to the instruction, the steering motor control unit 103 drives the steering motor 65 so that the steering AF is equal to the target steering angle AFt. This causes the steering angle AF of the vehicle 10 to be changed to the target steering angle AFt. In this manner, the vehicle control unit 100 and the steering motor control unit 103 serve as a front wheel control unit for controlling the steering device 41.

It should be noted that the vehicle control unit 100 begins to turn the front wheel 12F (S180) after the beginning of change in the lean angle T (S170) and before the end of change in the lean angle T (S170). The vehicle control unit 100 may begin to turn the front wheel 12F (S180) after the end of change in the lean angle T (S170).

The target steering angle AFt is determined based on the steering wheel angle. In this embodiment, the vehicle control unit 100 identifies a first reference steering angle AF1 when the velocity V is equal to 0, and a second reference steering angle AF2 when the velocity V is equal to the threshold value Vth. Then, the vehicle control unit 100 uses the first reference steering angle AF1 and second reference steering angle AF2 to calculate the target steering angle AFt corresponding to the steering wheel angle and velocity V.

The first reference steering angle AF1 is determined based on the steering wheel angle. In this embodiment, the first reference steering angle AF1 is a value obtained by multiplying the steering wheel angle (in degree) by a predetermined coefficient (e.g. 40/60). It should be noted that instead of the proportional relationship, a variety of relationships such that the larger the absolute value of steering wheel angle is, the larger is the absolute value of first reference steering angle AF1 may be adopted as a correspondence between the steering wheel angle and the first reference steering angle AF1. Information which represents the correspondence between the steering wheel angle and the first reference steering angle AF1 is stored in advance within the non-volatile memory of the vehicle control unit 100. The vehicle control unit 100 references to this information to identify the first reference steering angle AF1 corresponding to the steering wheel angle according to the predetermined correspondence in the referenced information.

The second reference steering angle AF2 is an estimated steering angle AF of the front wheel 12F which is turnable when the velocity V is equal to the threshold value Vth. As discussed above, if the velocity V is equal to the threshold value Vth, the first target lean angle T1 is identified based on the steering angle. In S140, the front wheel 12F turns to a direction of the steering angle AF specified based on the turning radius R obtained by substituting the first target lean angle T1 into Equation 6, and Equation 7. This steering angle AF is the second reference steering angle AF2. The vehicle control unit 100 calculates the second reference steering angle AF2 from the first target lean angle T1 mapped to the steering wheel angle (FIG. 10: S130), Equation 6, and Equation 7.

In this embodiment, the vehicle control unit 100 calculates the target steering angle AFt corresponding to the velocity V by linearly interpolating between the first reference steering angle AF1 at V=0 and the second reference steering angle AF2 at V=Vth. It should be noted that the target steering angle AFt may be unproportional to the velocity V. For example, the target steering angle AFt may change in a curved manner with the change in velocity V. In any event, preferably, the correspondence between the velocity V and the target steering angle AFt is predetermined so that the target steering angle AFt smoothly changes from the first reference steering angle AF1 to the second reference steering angle AF2 as the velocity V changes from 0 to the threshold vale Vth.

Furthermore, in this embodiment, the absolute value of the first reference steering angle AF1 at V=0 is larger than that of the second reference steering angle AF2 at V=Vth. This allows the minimum turning radius of the vehicle 10 to be reduced when the velocity V is lower.

In response to completion of S170, S180, the process of FIG. 10 ends. The controller 110 repeatedly performs the process of FIG. 10. If the release condition is not met, the controller 110 continues to operate the steering device 41 in the second mode, control the lean angle T in S170, and control the steering angle AF in S180. As a result, the vehicle 10 runs toward a traveling direction appropriate to the steering wheel angle.

When the velocity V changes from a value smaller than the threshold value Vth to a value greater than the threshold value Vth, firstly, the lean angle T is controlled in S170 of FIG. 10, and the steering angle AF is controlled in S180. Then, once the velocity V becomes equal to or greater than the threshold Vth, the lean angle T is controlled in S130, and the steering angle AF spontaneously changes in S140. On the other hand, when the velocity V changes from a value greater than the threshold value Vth to a value smaller than the threshold value Vth, firstly, the lean angle T is controlled in S130, and the steering angle AF spontaneously changes in S140. Then, once the velocity V becomes smaller than the threshold Vth, the lean angle T is controlled in S170, and the steering angle AF is controlled in S180. As discussed above, the lean angle T at V=Vth is the same between S130 and S170. Therefore, a rapid change in the lean angle T is suppressed even if the velocity V changes across the threshold value Vth. In addition, the steering angle AF at V=Vth is approximately the same between S130 and S170. Therefore, a rapid change in the steering angle AF is suppressed even if the velocity V changes across the threshold value Vth. These can result in improved driving stability of the vehicle.

The vehicle control unit 100 and the drive device control unit 101 serve as a drive control unit for controlling the electric motors 51L, 51R according to the accelerator operation amount and brake operation amount although not illustrated. In this embodiment, specifically, the vehicle control unit 100 supplies the drive device control unit 101 with an instruction for increasing output power of the electric motors 51L, 51R when the accelerator operation amount is increased. According to the instruction, the drive device control unit 101 controls the electric motors 51L, 51R so as to increase their output power. The vehicle control unit 100 supplies the drive device control unit 101 with an instruction for decreasing output power of the electric motors 51L, 51R when the accelerator operation amount is decreased. According to the instruction, the drive device control unit 101 controls the electric motors 51L, 51R so as to decrease their output power.

The vehicle control unit 100 supplies the drive device control unit 101 with an instruction for decreasing output power of the electric motors 51L, 51R when the brake operation amount becomes larger than 0. According to the instruction, the drive device control unit 101 controls the electric motors 51L, 51R so as to decrease their output power. It should be noted that the vehicle 10 preferably has a brake device which frictionally reduces rotational rate of at least one of all the wheels 12F, 12L, 12R. In addition, the brake device preferably reduces the rotational rate of the at least one wheel when the user steps on the brake pedal 46.

As described above, in this embodiment, because the gravity center 90c of the vehicle body 90 is lower than the roll axis AxR as illustrated in FIGS. 1 and 6, the orientation of the vehicle body 90 about the roll axis AxR can be stabilized even if the vehicle 10 makes a change in traveling direction. In addition, when a turning direction is input to the steering wheel 41a (in this embodiment, specifically, the orientation of the steering wheel 41a, i.e. steering angle, is changed), the lean angle T of the vehicle 10 is changed so that the vehicle 10 leans toward the turning direction. Therefore, the turning of the vehicle 10 can be stabilized.

In addition, the front wheel 12F turns to such a direction that the vehicle 10 turns to the turning direction after the beginning of change in the lean angle T. For example, if the release condition is met (FIG. 10: S110: Yes), the front wheel 12F turns spontaneously, following the beginning of change in the lean angle T, to such a direction that the vehicle 10 turns to the turning direction, as described with regard to S120-S140. If the release condition is not met (FIG. 10: S110: No), the front wheel 12F turns to such a direction that the vehicle 10 turns to the turning direction under control of the controller 110 after the beginning of change in the lean angle T, as described with regard to S160-S180.

If the front wheel 12F turned prior to changing the lean angle T, the vehicle 10 could shake due to the turning of the front wheel 12F. For example, if the steering angle AF begins to change into zero before the lean angle T begins to change into zero during turning, the turning radius R is increased while the vehicle 10 is leaning, and so the centrifugal force against the lean angle T decreases. Accordingly, the vehicle 10 will further lean to the turning direction. This may result in shaking of the vehicle 10. Furthermore, if the steering angle AF changes from zero before the vehicle 10 begins to lean during straight movement, a centrifugal force acts on the vehicle 10 in its upright state. This may result in shaking of the vehicle 10.

In this embodiment, the front wheel 12F is turned after the beginning of changing the lean angle T rather than before the beginning of changing the lean angle T. Therefore, shaking of the vehicle is suppressed. The above can enable driving stability of the vehicle to be improved.

In addition, as described with regard to FIG. 2, the steerable wheel is the front wheel 12F rather than the rear wheels 12L, 12R. Therefore, a user's feeling of strangeness is reduced when the user changes the steering angle AF during a drive.

In addition, as described with regard to FIG. 1, the steering device 41 is configured so that the intersection point P2 between the turning axis Ax1 and the ground GL is located in front of the contact point P1 of the front wheel 12F with the ground GL. And, the steering device 41 has the first mode for turnably supporting the front wheel 12F regardless of a turning direction input via the steering wheel 41a. Therefore, when the steering device 41 operates in the first mode, the front wheel 12F can spontaneously turn, following the beginning of change in the lean angle T, to such a direction that the vehicle 10 turns to the turning direction. In this manner, the traveling direction of the vehicle 10 can be smoothly changed even if the direction of the front wheel 12F is not controlled. This can result in improved driving stability of the vehicle 10.

In addition, as described with regard to FIG. 5, the rear wheel support 80 changes the respective lean angles T of the pair of rear wheels 12L, 12R and the vehicle body 90 with respect to the ground GL. Therefore, stability during high speed turn can be improved because the gravity center 90c is located at a lower position as compared with the case where the vehicle body 90 leans without the pair of rear wheels 12L, 12R leaning.

In addition, as described with regard to FIG. 2, the front wheel, which is supported by the support (e.g. steering device 41) for supporting the front wheel so that it can be turned about the turning axis Ax1 to the turning direction, is configured as the single front wheel 12F. Therefore, the traveling direction of the vehicle 10 can be smoothly changed because the front wheel 12F turns toward the turning direction more readily as compared with the case where two or more steering front wheels are provided. This can result in improved driving stability of the vehicle. In addition, the rear wheels of the vehicle 10 are configured as the pair of rear wheels 12L, 12R. In this manner, the total number of wheels of the vehicle 10 is more than 2. Therefore, the vehicle 10 is self-standing without falling. This can result in improved driving stability of the vehicle.

B. Second Embodiment

Figure 11:
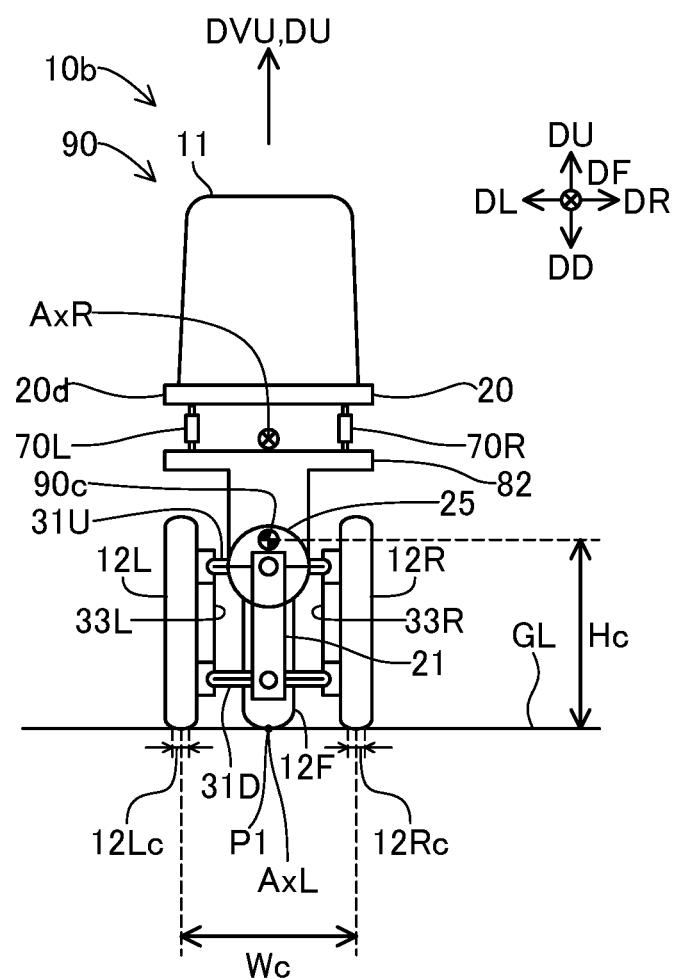
FIG. 11 is an explanatory diagram showing a vehicle 10b in a second embodiment.

FIG. 11 is an explanatory diagram showing a vehicle 10b in the second embodiment. This figure shows a simplified rear view of the vehicle 10b similarly to FIG. 5(A). The vehicle 10b differs from the vehicle 10 of FIG. 5(A) only in that the overall width of the vehicle 10b is reduced. Specifically, the lateral link members 31U, 31D are shorter, and the widths (i.e. lengths in the right direction DR) of a plurality of members including the first support portion 82, the main body 20, the seat 11, and the rear wheels 12L, 12R are reduced. The configurations of the other parts of the vehicle 10b are the same as those of the corresponding parts of the vehicle 10 in the first embodiment. In FIG. 11, the same references as those of the corresponding components in FIG. 5 are used as the references of the components of the vehicle 10b. The controller (not shown) of the vehicle 10b controls the vehicle 10b according to the flowchart in FIG. 10 in the same manner as the controller 110 of the first embodiment.

This figure shows a height Hc and a distance Wc. The height Hc is a height of the gravity center 90c of the vehicle body 90 from the ground GL. The distance Wc is a distance (distance in the right direction DR) between centers of respective contact surfaces 12Lc, 12Rc of the pair of rear wheels 12L, 12R when viewing in the front direction DF. The center of contact surface when viewing in the front direction DF is a location which bisects the distance in the right direction DR between the end in the left direction DL side and the end in the right direction side of the contact surface. In the embodiment of FIG. 11, the distance Wc is smaller than the height Hc. As described above, the driving stability of the vehicle 10 is improved in the first embodiment. Therefore, even if the distance Wc is smaller than the height Hc as in the embodiment of FIG. 11, the vehicle 10b can run stably. In addition, the smaller distance Wc can allow for a narrower width of the vehicle 10b. As a result, the vehicle 10b can readily travel on a narrow road. It should be noted that the distance Wc is larger than the height Hc in the first embodiment although not illustrated. Such a configuration can further improve the driving stability.

C. Modifications (1) The device which couples the vehicle body 90 to the rear wheel support 80 rotatably about the roll axis AxR is not limited to the combination of the suspension system 70 and the connector 75, but may include any device. For example, a device may be employed that has a shaft extending along the roll axis AxR and a bearing for rotatably supporting the shaft. In this case, one of the shaft and bearing is secured to the vehicle body 90, and the other is secured to the rear wheel support 80.

(2) The lean angle changing unit which changes, about the lean axis AxL, the lean angle T of the vehicle body 90 in the width direction may include a variety of configurations which change the respective lean angles of the pair of rear wheels 12L, 12R and the vehicle body 90 with respect to the ground GL. For example, instead of the configuration illustrated in FIG. 4, the link mechanism 30 may be configured by combining more link members.

Alternatively, a configuration may be employed that changes the lean angle of the vehicle body 90 without the lean angle of the wheels relative to the ground GL. For example, a device may be employed that can change the orientation (i.e. lean angle) of the vehicle body 90 relative to the rear wheel support for rotatably supporting the rear wheels 12L, 12R. Such a device may include, for example, a device which is achieved by modifying the embodiment of FIGS. 4 and 11 as follows. The link members 31U, 31D, 33L, 21, 33R are attached each other unrotatably. The whole of the link members 31U, 31D, 33L, 21, 33R attached each other correspond to the rear wheel support. Then, the first support portion 82 is coupled to the center longitudinal link member 21 rotatably relative to the center longitudinal link member 21. The lean motor 25 can change the orientation of the first support portion 82 relative to the center longitudinal link member 21 to the left direction DL side and to the right direction DR side. With such a configuration, the lean motor 25 can change the lean angle of the vehicle body 90 about the rotational axis at the coupling portion between the center longitudinal link member 21 and the first support portion 82.

In any event, an axis different from the roll axis of the vehicle body 90 may be employed as the lean axis which is a central axis about which the lean angle changing unit changes the lean angle. It is preferable that the lean axis is lower than the gravity center 90c, as illustrated in FIG. 6. Specifically, on a plane having the same location as the gravity center 90c in the front direction DF (i.e. on a plane which includes the gravity center 90c and is perpendicular to the front direction DF), the lean axis is preferably located in the downward direction DD side of the gravity center 90c. This causes the gravity center 90c to move toward the turning direction side in relation to the wheels when the vehicle body 90 leans. Therefore, as the force F2b of FIG. 7, the movement of the gravity center 90c can produce a force which acts in equilibrium with some component of the centrifugal force (the force F1b of FIG. 7). This can stabilize the turning of the vehicle.

(3) Instead of the method of controlling the vehicle 10, 10b as shown in FIG. 10, a variety of other methods may be employed. For example, S110, S160-S180 of FIG. 10 may be omitted. In this case, S100 is followed by S120. In addition, the second mode of the steering device 41, the steering motor 65, and the steering motor control unit 103 (more generally, front wheel control unit) may be omitted. Alternatively, S110-S140 of FIG. 10 may be omitted. In this case, S100 is followed by S160. Furthermore, in this case, the steering angle AF is controlled by the steering motor 65. Therefore, the intersection point P2 (FIG. 1) may be located at the same position as the contact point P1, or may located in the back direction DB side of the contact point P1. In addition, the first mode of the steering device 41 may be omitted.

(4) Any configuration may be employed to achieve the vehicle body 90 whose gravity center 90c is lower than the roll axis AxR. For example, the battery 120 may be located at any other position below the roll axis AxR instead of the position shown in FIGS. 1 and 2. Alternatively, a portion of the vehicle body 90 which is located below the roll axis AxR (e.g. bottom portion 20b) may be made heavier.

(5) Instead of the above-described configuration of the vehicle 10, 10b, a variety of other configurations may be employed. For example, the operation input unit for inputting a turning direction and operation amount desired by the user through the user's operation may include any other device instead of a rotatable device such as the steering wheel 41a. For example, a lever may be employed that can be tilted to right direction and to left direction. In addition, the drive device for driving the wheels may be an electric motor coupled to the wheels via gears instead of the in-wheel motors which directly drive the wheels. An internal combustion engine may be employed instead of the electric motor. The vehicle may be a tricycle which has two front wheels and one rear wheel. In this case, the front wheel support (e.g. steering device 41) supports the two front wheels turnably to a turning direction about their turning axes. The vehicle may have two or more front wheels and two or more rear wheels. The steerable wheel may be a rear wheel(s). However, if the steerable wheel is the front wheel(s), a feeling of strangeness during steering can be reduced as compared with the case where the steerable wheel is the rear wheel(s). Alternatively, the drive wheel may be the front wheel. Alternatively, the drive wheel may also serve as the steerable wheel.

(6) A variety of other configurations may be employed instead of the vehicle control unit 100 and the lean motor control unit 102 to achieve the lean control unit for controlling the lean angle changing unit (the link mechanism 30 and lean motor 25 in the embodiment of FIG. 4). For example, a single device having a single computer may control the lean angle changing unit. In any event, the lean control unit preferably controls the lean angle changing unit according to an operation amount (i.e. steering angle desired by user) input to the operation input unit (e.g. steering wheel 41a). For example, the lean control unit preferably uses the operation amount to identify a target lean angle, and then controls the lean angle changing unit so that the lean angle becomes the target lean angle. A variety of other correspondence may be employed as a correspondence between the operation amount of the operation input unit and the target lean angle, instead of the correspondence in the above-described embodiment. In general, the controller preferably identifies the target lean angle from the operation amount according to a predetermined procedure.

(7) A variety of other configurations may be employed instead of the vehicle control unit 100 and the steering motor control unit 103 to achieve the front wheel control unit for controlling the front wheel support for supporting the front wheel turnably to a turning direction (the steering device 41 in the embodiment of FIG. 1). For example, a single device having a single computer may control the front wheel support. Alternatively, a single computer may perform the processes of a plurality of control units including the front wheel control unit and the lean control unit. In this case, a portion of the computer which performs the function of the front wheel control unit (e.g. a portion of the non-volatile memory which stores the program for the front wheel control unit, the volatile memory, and the processor) corresponds to the front wheel control unit. Furthermore, a portion of the computer which performs the function of the lean control unit (e.g. a portion of the non-volatile memory which stores the program for the lean control unit, the volatile memory, and the processor) corresponds to the lean control unit.

In any event, the front wheel support preferably has as an operation mode the first mode for turnably supporting the front wheel regardless of a turning direction input into the operation input unit (e.g. steering wheel 41*a*). Then, if a particular condition (e.g. release condition of FIG. 10) is met, the front wheel control unit preferably operates the front wheel support in the first mode.

In addition, the front wheel support preferably has as an operation mode the second mode in which the front wheel is prevented from being free to turn, and the steering angle AF is controlled by the front wheel control unit. Then, if the particular condition is not met, the front wheel control unit preferably operates the front wheel support in the second mode. In this case, the front wheel control unit preferably controls the front wheel support according to an operation amount input to the operation input unit. For example, the front wheel control unit preferably uses the operation amount to identify a target steering angle, and then controls the front wheel support so that the steering angle becomes the target steering angle. A variety of other correspondence may be employed as a correspondence between the operation amount of the operation input unit and the target steering angle, instead of the correspondence in the above-described embodiment. In general, the controller preferably identifies the target steering angle from the operation amount according to a predetermined procedure. It should be noted that instead of the above-described configuration of the front wheel support, a variety of other configurations may be employed. For example, the steering motor 65 and the front fork 17 are coupled via gears.

Furthermore, a variety of other conditions may be employed as the particular condition for switching between the first and second modes, instead of the above-described release condition. In general, it is preferable to employ as the particular condition a condition including that the velocity is equal to or larger than a predetermined threshold value.

In each embodiment described above, some of the components which are achieved by hardware may be substituted with software while some or all of the components which are achieved by software may be substituted with hardware. For example, the function of the vehicle control unit 100 in FIG. 9 may be achieved by a dedicated hardware circuitry.

In addition, if some or all of the functions of the present invention are achieved by a computer program, the program can be provided in the form of a computer-readable storage medium (e.g. non-transitory storage medium) having the program stored therein. The program can be used while being stored in a storage medium (computer-readable storage medium) which is the same as or different from the provided storage medium. The "computer-readable storage medium" is not limited to a portable storage medium such as memory card or CD-ROM, but may also include an internal storage within the computer such as various types of ROM, and an external storage connected to the computer such as hard disk drive.

The present invention has been described above with reference to the embodiments and the modifications although the above-described embodiments are intended to facilitate the understanding of the invention, but not to limit the invention. The present invention may be modified or improved without departing from the spirit and scope of the claims, and includes its equivalents.

INDUSTRIAL APPLICABILITY

The present invention can be preferably used for a vehicle.

DESCRIPTION OF THE REFERENCES

10, 10*b* vehicle
11 seat
12F front wheel
12L left rear wheel (drive wheel)
12R right rear wheel (drive wheel)
12L*a*, 12R*a* wheel
12L*b*, 12R*b* tire
12L*c*, 12R*c* contact surface
17 front fork
20 main body
20*a* front portion
20*b* bottom portion
20*c* rear portion
20*d* support portion
25 lean motor
30 link mechanism
31D lower lateral link member
31U upper lateral link member
33L left longitudinal link member
21 center longitudinal link member
33R right longitudinal link member
41 steering device
41*a* steering wheel
41*ax* supporting rod
45 accelerator pedal
46 brake pedal
47 shift switch
51L left electric motor
51R right electric motor
65 steering motor
70 suspension system
70L left suspension
70R right suspension
70L*a* central axis
75 connector
80 rear wheel support
82 first support portion
83 second support portion
90 vehicle body
90*c* gravity center
100 vehicle control unit
101 drive device control unit
102 lean motor control unit
103 steering motor control unit 110 controller
120 battery
122 vehicle speed sensor
123 steering wheel angle sensor
124 steering angle sensor
125 lean angle sensor
145 accelerator pedal sensor
146 brake pedal sensor
147 shift switch
T lean angle
V velocity
R turning radius
P1 contact point
P2 intersection
F1 first force
F2 second force
F1b force
F2b force
T1 first target lean angle
T2 second target lean angle
DF front direction
DB back direction
DU upward direction
DD downward direction
DL left direction
DR right direction
AF steering angle
GL ground
Cf front center
Cb rear center
Cr turning center
Wc distance
Lh wheelbase
Lt trail
D12 direction
Ax1 turning axis
DVU vehicle upward direction
AxL lean axis
AxR roll axis

The invention claimed is:

1. A vehicle comprising:
a vehicle body rotatable about a roll axis;
one or more front wheels;
a front wheel support supporting the one or more front wheels turnably to a turning direction about a turning axis;
one or more rear wheels;
an operation input unit to be operated to input a turning direction;
a lean angle changing unit configured to change a lean angle of the vehicle body in a vehicle width direction about a lean axis different from the roll axis; and
a lean control unit configured to control the lean angle changing unit, wherein
the one or more front wheels or the one or more rear wheels includes a pair of wheels arranged in the vehicle width direction,
the vehicle body is configured so that a gravity center of the vehicle body is located below the roll axis,
when a turning direction is input to the operation input unit, the lean control unit causes the lean angle changing unit to change the lean angle so that the vehicle body leans toward the turning direction, and
the one or more front wheels turn, after beginning of change in the lean angle, to such a direction that the vehicle turns to the turning direction.

2. The vehicle of claim 1, wherein
the front wheel support is configured so that an intersection point between the turning axis and a ground is located in front of a contact point of the one or more front wheels with the ground, and
the front wheel support has an operation mode for turnably supporting the one or more front wheels regardless of a turning direction input into the operation input unit.

3. The vehicle of claim 1, wherein
the lean angle changing unit changes respective lean angles of the pair of wheels and the vehicle body with respect to the ground.

4. The vehicle of claim 1, wherein
when viewing in a front direction of the vehicle, a distance between centers of respective contact surfaces of the pair of wheels is smaller than a height of the gravity center of the vehicle body from the ground.

5. The vehicle of claim 1, wherein
the one or more front wheels are configured as a single wheel, and
the one or more rear wheels are configured as the pair of wheels.

6. The vehicle of claim 1, comprising:
a front wheel control unit configured to control the front wheel support.

* * * * *